(12) United States Patent
McKinzie

(10) Patent No.: US 9,354,636 B2
(45) Date of Patent: May 31, 2016

(54) USER-INTERFACE FOR PUMP SYSTEM

(71) Applicant: Regal Beloit America, Inc., Beloit, WI (US)

(72) Inventor: Marc C. McKinzie, West Milton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 426 days.

(21) Appl. No.: 13/832,588

(22) Filed: Mar. 15, 2013

(65) Prior Publication Data

US 2014/0277775 A1    Sep. 18, 2014

(51) Int. Cl.
G05D 7/06 (2006.01)
F04B 49/06 (2006.01)
F04B 49/20 (2006.01)

(52) U.S. Cl.
CPC ............ *G05D 7/0617* (2013.01); *F04B 49/065* (2013.01); *F04B 49/20* (2013.01)

(58) Field of Classification Search
None
See application file for complete search history.

(56) References Cited

U.S. PATENT DOCUMENTS

| | | | |
|---|---|---|---|
| 4,910,682 A | 3/1990 | Wolff et al. | |
| 5,217,478 A | 6/1993 | Rexroth | |
| 5,220,478 A | 6/1993 | Innes et al. | |
| 5,269,794 A | 12/1993 | Rexroth | |
| 5,343,590 A | 9/1994 | Radabaugh | |
| 5,949,346 A | 9/1999 | Suzuki et al. | |
| 7,334,510 B2 | 2/2008 | Gerdes et al. | |
| 7,351,274 B2 | 4/2008 | Helt et al. | |
| 7,536,936 B2 | 5/2009 | Gerdes et al. | |
| 7,640,832 B2 | 1/2010 | Gerdes et al. | |
| 7,681,478 B2 | 3/2010 | Gerdes et al. | |
| 8,046,185 B1 | 10/2011 | Chui | |
| 8,188,876 B1 | 5/2012 | Holley et al. | |
| 2005/0016338 A1 | 1/2005 | Gerdes et al. | |
| 2005/0022639 A1 | 2/2005 | Gerdes et al. | |
| 2006/0045749 A1 | 3/2006 | Beckman | |
| 2007/0039462 A1 | 2/2007 | Helt et al. | |
| 2007/0154323 A1* | 7/2007 | Stiles et al. | 417/44.1 |
| 2008/0016996 A1 | 1/2008 | Gerdes et al. | |
| 2008/0031740 A1 | 2/2008 | Miyazaki et al. | |
| 2008/0121076 A1 | 5/2008 | Gerdes et al. | |
| 2009/0038696 A1 | 2/2009 | Levin et al. | |
| 2010/0092308 A1* | 4/2010 | Stiles et al. | 417/44.11 |
| 2011/0087390 A1 | 4/2011 | Pandit et al. | |
| 2012/0042667 A1 | 2/2012 | Fulmer et al. | |
| 2012/0104878 A1* | 5/2012 | Heilman et al. | 310/43 |
| 2012/0157253 A1 | 6/2012 | Hoff | |
| 2013/0129536 A1* | 5/2013 | Robol et al. | 417/410.1 |

FOREIGN PATENT DOCUMENTS

AU    2012244365    11/2012
CN    102115229    7/2011

(Continued)

OTHER PUBLICATIONS

Extended European Search Report for Application No. 142750595 dated Jun. 2, 2015 (8 pages).

*Primary Examiner* — Sean Shechtman
*Assistant Examiner* — Steven Garland
(74) *Attorney, Agent, or Firm* — Michael Best & Friedrich LLP

(57) ABSTRACT

A pump system including a motor, a user-interface, and a controller. The user-interface having a single bar graph comprised of light-emitting diodes to provide visual feedback to an operator. The bar graph is used for programming purposes and for providing a motor speed and run duration status to the operator.

19 Claims, 7 Drawing Sheets

(56) References Cited

FOREIGN PATENT DOCUMENTS

| | | |
|---|---|---|
| GB | 2301894 | 12/1996 |
| WO | 2007021854 | 2/2007 |
| WO | 2010107536 | 9/2010 |
| WO | 2011039771 | 4/2011 |
| WO | 2012087563 | 6/2012 |

* cited by examiner

USER-INTERFACE FOR PUMP SYSTEM

BACKGROUND

The present invention relates to a user-interface for a pump system.

SUMMARY

Pump systems often include a user-interface for operating a motor of the pump system. Often times the user-interface includes a liquid-crystal display (LCD). However, LCDs are often relatively large and costly.

In one embodiment, the invention provides a single bar graph comprised of light-emitting diodes to provide visual feedback to an operator. The bar graph is used for programming purposes and for providing a motor speed and run duration status to the operator.

In another embodiment, the invention provides a pump system comprising a pump housing, a motor connected to the pump housing, a user-interface, and a controller. The user-interface including a plurality of indicators, a speed indicator, a duration indicator, a positive input, a negative input, and a stage input. The controller including a processor and a computer readable memory storing instructions that, when executed by the processor, cause the controller to receive a first input from the stage input, activate the speed indicator, receive a stage speed input from at least one of the positive input and the negative input, the stage speed input representing a selected stage speed, activate at least one of the plurality of indicators indicating the selected stage speed, receive a second input from the stage input, activate the duration indicator, receive a stage duration input from at least one of the positive input and the negative input, the stage duration input representing a selected stage duration, activate at least one of the plurality of lights indicating the selected stage duration, and operate the motor at the selected stage speed for the selected stage duration.

In another embodiment the invention provides a method of receiving operator instruction for controlling a pump system. The pump system including a pump housing, a motor connected to the pump housing, and a user-interface including a plurality of indicators, a speed indicator, a duration indicator, a positive input, a negative input, and a stage input. The method comprising receiving a first input from the stage input; activating the speed indicator; receiving a stage speed input from at least one of the positive input and the negative input, the stage speed input representing a selected stage speed; activating at least one of the plurality of indicators indicating the selected stage speed; receiving a second input from the stage input; activating the duration indicator; receiving a stage duration input from at least one of the positive input and the negative input, the stage duration input representing a selected stage duration; activating at least one of the plurality of lights indicating the selected stage duration; and operating the motor at the selected stage speed for the selected stage duration.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
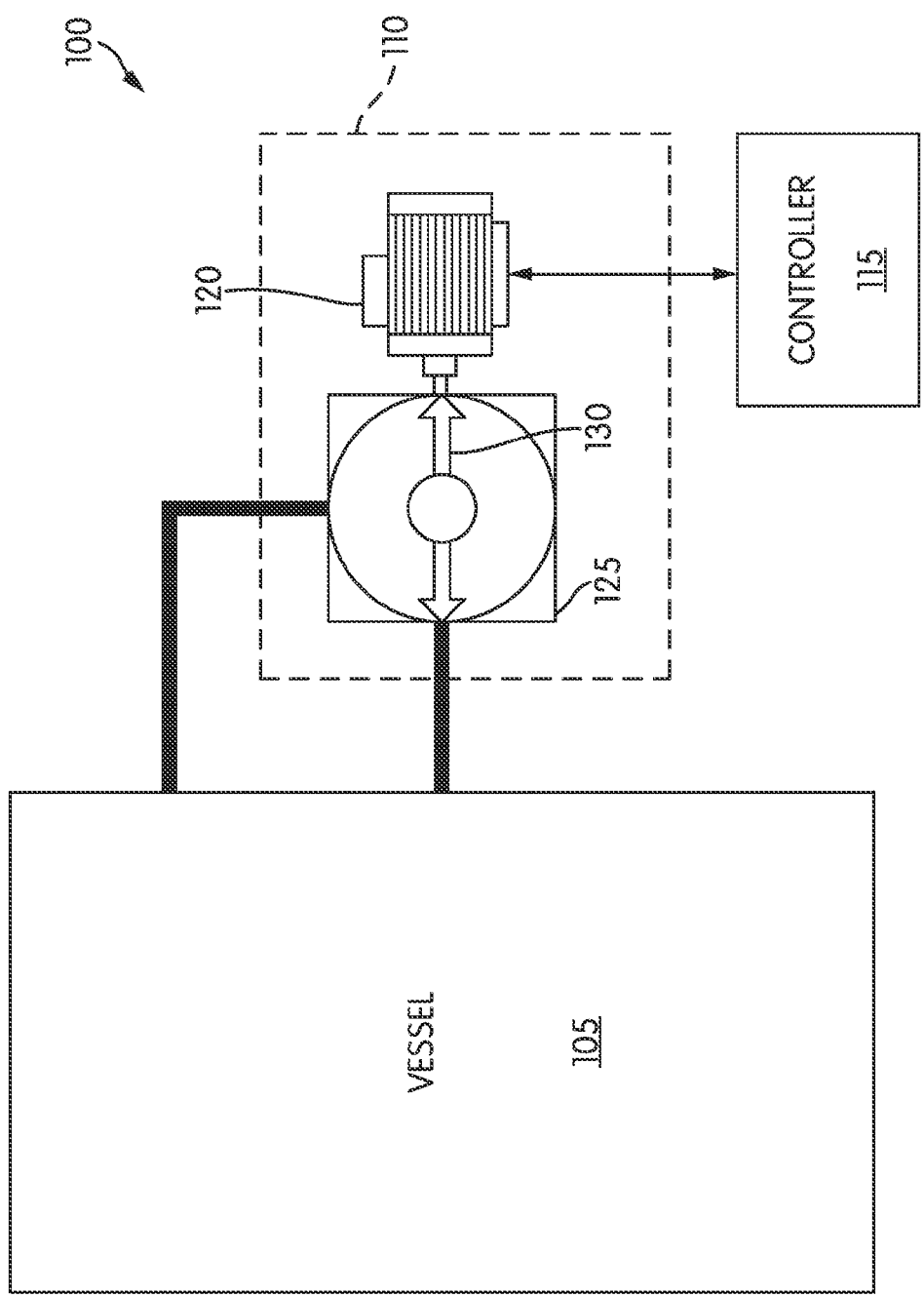
FIG. 1 illustrates a pool system according to one embodiment of the invention.

FIG. 1 illustrates a pool or spa system 100 according to a construction. The pool system 100 includes a vessel 105, a pump system 110, and a controller 115. In some constructions, the vessel 105 is a hollow container such as a tub, pool, or vat that holds a fluid. The fluid can be any type of fluid. In some constructions, the fluid is chlorinated water.

The pump system 110 includes a motor 120, a fluid pump 125 coupled to the motor 120, and a fluid agitator 130 located within the fluid pump 135. In one construction, the motor 120 is a brushless direct-current (BLDC) motor. As is commonly known, BLDC motors include a stator, a permanent magnet rotor, and an electronic commutator. The electronic commutator is electrically connected to a motor controller. The motor controller controls the electronic commutator. The electronic commutator then provides the appropriate electrical energy to the stator in order to rotate the permanent magnet rotor at a desired speed. In other constructions, the motor 120 can be a variety of other types of motors, including but not limited to, a brush direct-current motor, a stepper motor, a synchronous motor, or other DC or AC motors. In some constructions, the motor 120 is a variable speed motor. In other constructions, the motor 120 can be a multi-speed motor or a single speed motor. The fluid agitator 130 is a rotor, such as an impeller or a fan. In operation, the motor 120 rotates the fluid agitator 130 located in the fluid pump 135. As the fluid agitator 130 rotates, fluid is pumped through the fluid pump 135.

Figure 2:
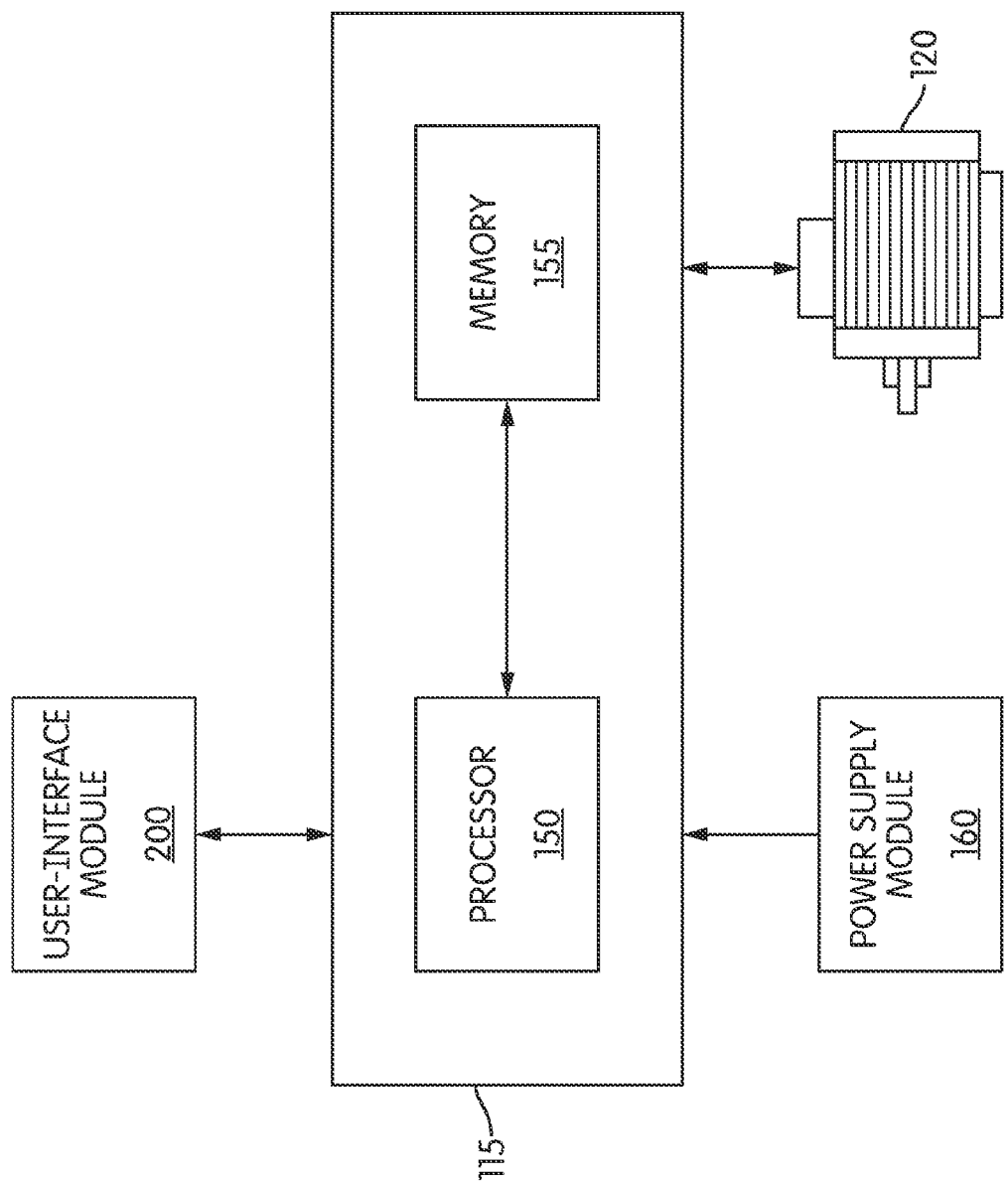
FIG. 2 illustrates a controller of the pool system of FIG. 1.

FIG. 2 illustrates the controller 115 of the pool system 100. The controller 115 is electrically and/or communicatively connected to a variety of modules or components of the pool system 100. For example, the controller 115 is connected to the motor 120 via the motor controller. The controller 115 includes combinations of hardware and software that are operable to, among other things, control the operation of the pool system 100.

In some constructions, the controller 115 includes a plurality of electrical and electronic components that provide power, operational control, and protection to the components and modules within the controller 115 and pool system 100. For example, the controller 115 includes, among other things, a processor 150 (e.g., a microprocessor, a microcontroller, or another suitable programmable device) and a memory 155. In some constructions, the controller 115 is implemented partially or entirely on a semiconductor (e.g., a field-programmable gate array ["FPGA"] semiconductor, microcontroller, or digital signal processor [DSP]) chip.

The memory 155 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor unit 150 is connected to the memory 155 and executes software instructions that are capable of being stored in a RAM of the memory 155 (e.g., during execution), a ROM of the memory 155 (e.g., on a generally permanent basis), or another non-transitory computer readable medium such as another memory or a disc. Software included in the implementation of the pool system 100 can be stored in the memory 155 of the controller 115. The software includes, for example, firmware, one or more applications, program data, filters, rules, one or more program modules, and other executable instructions. The controller 115 is configured to retrieve from memory and execute, among other things, instructions related to the control processes and methods described herein. In other constructions, the controller 115 includes additional, fewer, or different components.

The controller 115 receives power from a power supply module 160. The power supply module 160 supplies a nominal AC or DC voltage to the controller 115 or other components or modules of the pool system 100. The power supply module 160 is powered by, for example, a power source having nominal line voltages between 110V and 240V AC and frequencies of approximately 50-60 Hz. The power supply module 160 is also configured to supply lower voltages to operate circuits and components within the controller 115 or pool system 100. In other constructions, the controller 115 or other components and modules within the pool system 100 are powered by one or more batteries or battery packs, or another grid-independent power source (e.g., a generator, a solar panel, etc.).

Figure 3:
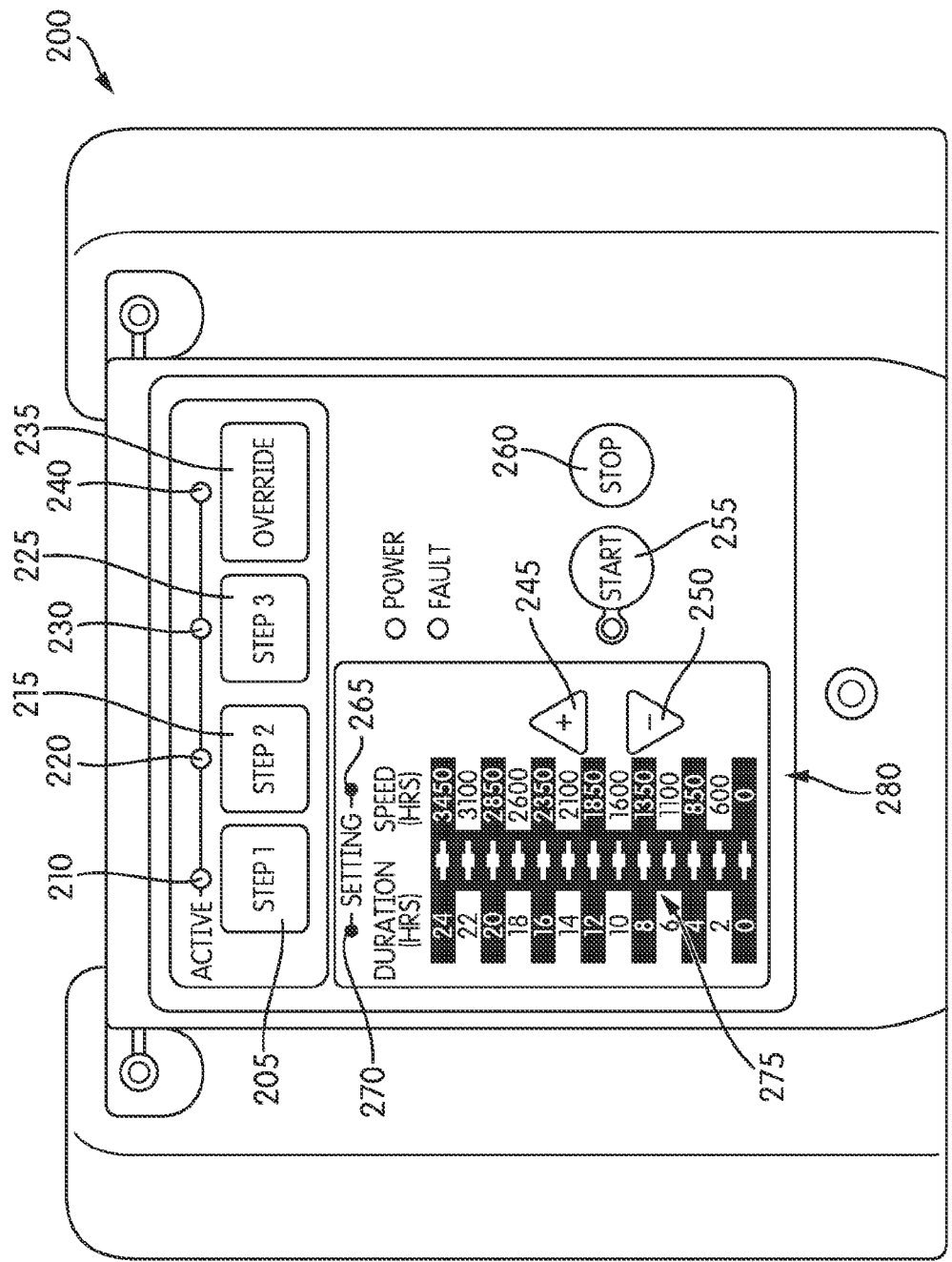
FIG. 3 illustrates a user-interface of the pool system of FIG. 1.
Figure 4A:
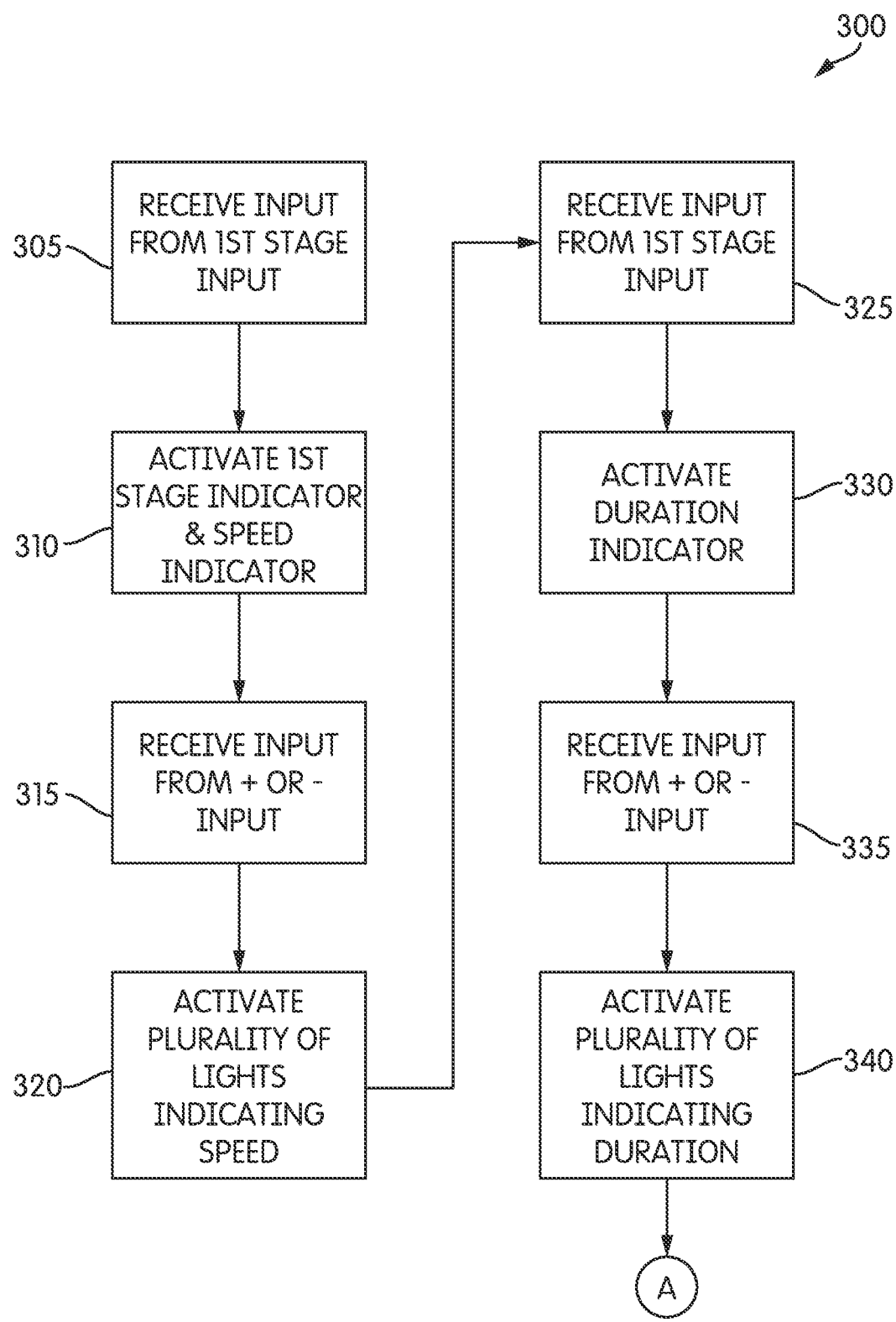
FIGS. 4a-4c illustrate an operation of the controller of FIG. 2.
Figure 4B:
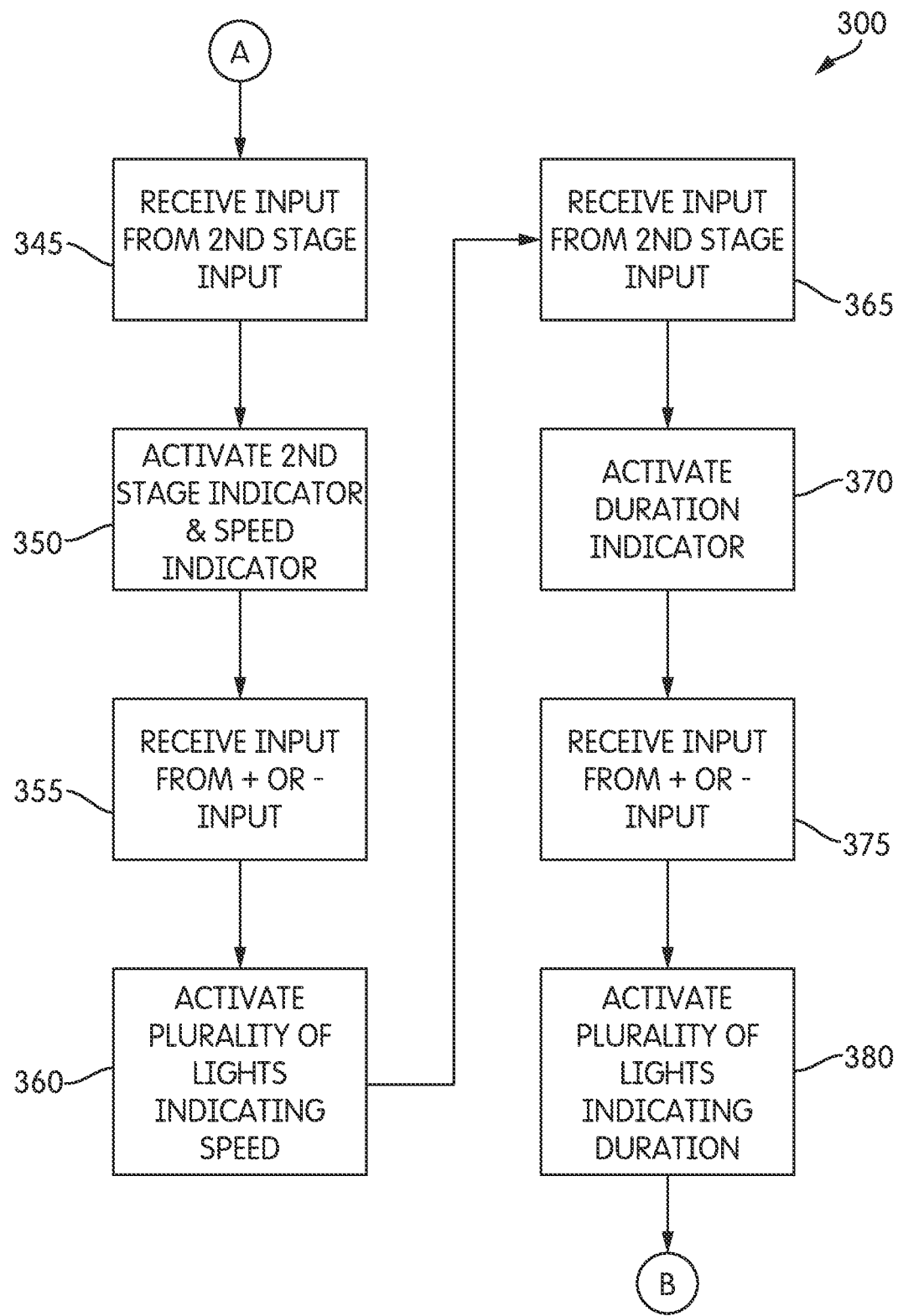
Figure 4C:
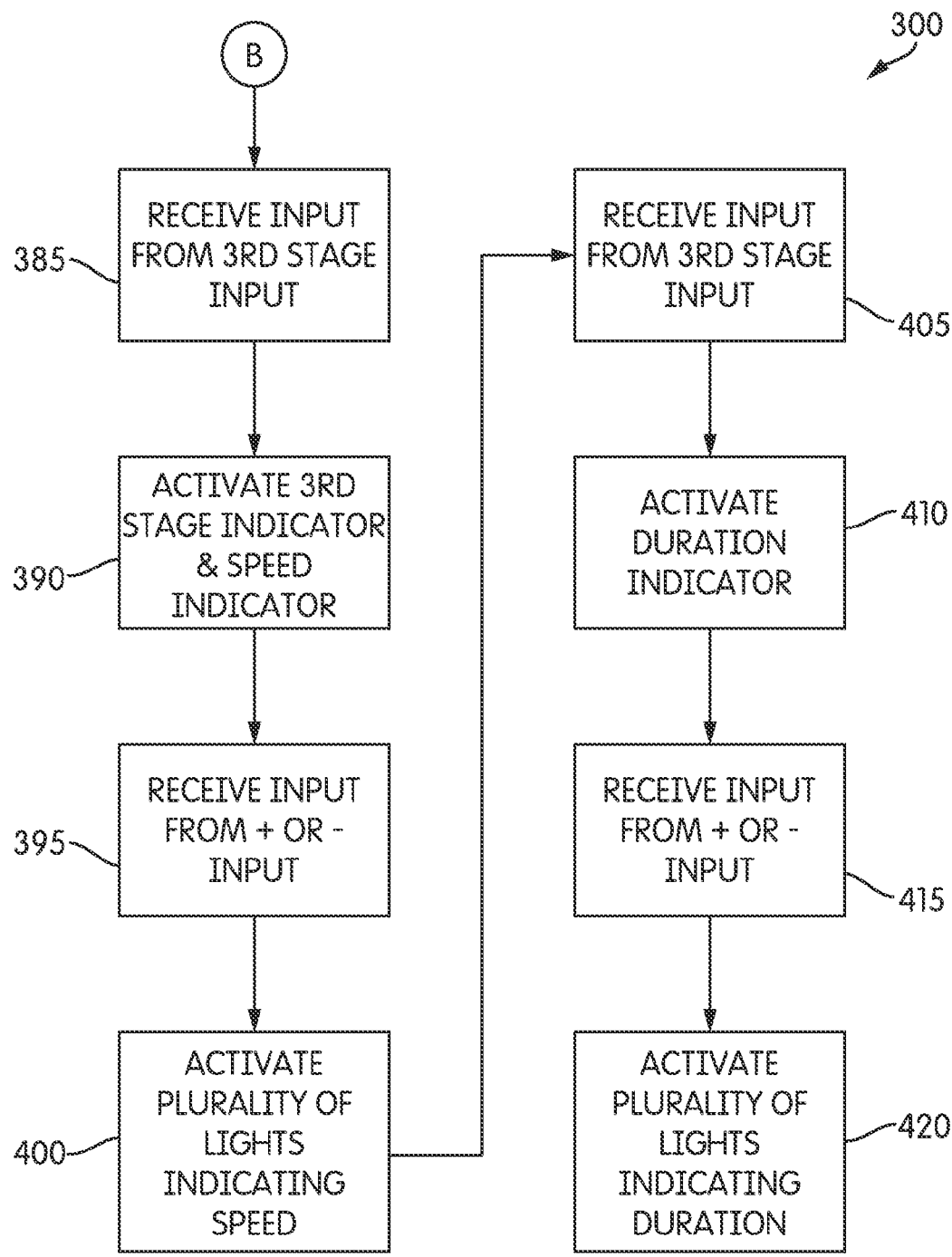

FIG. 3 illustrates a construction of a user-interface 200. The user-interface 200 is electrically coupled to the controller 115. The user-interface 200 is operable to receive instructions from an operator. The user-interface 200 outputs the instructions to the controller 115. The controller 115 controls the motor 120 according to the operator instructions. Examples of operator instructions include, but are not limited to, instructing the motor 120 to operate at a selected speed for a selected duration of time (e.g., 1600 RPM for 2 hours).

The user-interface 200 includes a first stage input 205, a first stage indicator 210, a second stage input 215, a second stage indicator 220, a third stage input 225, a third stage indicator 230, an override input 235, an override indicator 240, a positive input 245, a negative input 250, a start input 255, a stop input 260, a speed indicator 265, a duration indicator 270, a plurality of indicators 275, and an overlay membrane 280. In some constructions, the first stage input 205, the second stage input 215, the third stage input 225, the override input 235, the positive input 245, the negative input 250, the start input 255, and the stop input 260 are electrical push-buttons (e.g., pop-switches). In some constructions, the first stage indicator 210, the second stage indicator 220, the third stage indicator 230, the override indicator 240, a speed indicator 265, the duration indicator 270, and the plurality of indicators 275 are lights (e.g., light-emitting diodes [LEDs]). The overlay membrane 280 labels the various indicators and inputs. In some embodiments, the overlay membrane 280 is composed of plastic or a similar material. In other embodiments, the overlay membrane 280 is composed of rubber or a similar material. In the illustrated embodiment, the plurality of indicators 275 is formed into a vertical bar graph. In other embodiments, the plurality of indicators 275 are formed into other visual indication formats, such as, but not limited to, a horizontal bar graph or a circular graph.

The first stage input 205 and the first stage indicator 210, along with the positive input 245, the negative input 250, the speed indicator 265, the duration indicator 270, and the plurality of indicators 275, are used to set the operating speed and duration of the motor 120 during a first operation stage. The second stage input 215, and the second stage indicator 220, along with the positive input 245, the negative input 250, the speed indicator 265, the duration indicator 270, and the plurality of indicators 275, are used to set the operating speed and duration of the motor 120 during a second operation stage. The third stage input 225, and the third stage indicator 230, along with the positive input 245, the negative input 250, the speed indicator 265, the duration indicator 270, and the plurality of indicators 275, are used to set the operating speed and duration of the motor 120 during a third operating stage.

In operation, an operator begins setting the operating speed and duration of the first stage by activating the first stage input 205. The first stage indicator 210 will activate indicating to the operator that a first stage is being set. The speed indicator 265 will also activate indicating to the operator that a first stage speed is being set. The operator then uses the positive input 245 and negative input 250 to set the first stage speed. The operator then activates the first stage input 205 a second time. The first stage indicator 210 will remain activated. The speed indicator 265 will deactivate, while the duration indicator 270 will activate indicating to the operator that a first stage duration is being set. The operator then uses the positive input 245 and negative input 250 to set the first stage duration.

The operator begins setting the operating speed and duration of the second stage by activating the second stage input 215. The second stage indicator 220 will activate indicating to the operator that a second stage is being set. The speed indicator 265 will also activate indicating to the operator that a second stage speed is being set. The operator then uses the positive input 245 and negative input 250 to set the second stage speed. The operator then activates the second stage input 215 a second time. The second stage indicator 220 will remain activated. The speed indicator 265 will deactivate, while the duration indicator 270 will activate indicating to the operator that a second stage duration is being set. The operator then uses the positive input 245 and negative input 250 to set the second stage duration.

The operator begins setting the operating speed and duration of the third stage by activating the third stage input 225. The third stage indicator 230 will activate indicating to the operator that a third stage is being set. The speed indicator 265 will also activate indicating to the operator that a third stage speed is being set. The operator then uses the positive input 245 and negative input 250 to set the third stage speed. The operator then activates the third stage input 225 a second time. The third stage indicator 230 will remain activated. The speed indicator 265 will deactivate, while the duration indicator 270 will activate indicating to the operator that a third stage duration is being set. The operator then uses the positive input 245 and negative input 250 to set the third stage duration.

In some embodiments, the user-interface 200 includes a single stage input rather than a first stage input 205, a second stage input 215, and a third stage input 225. In such an embodiment, the operator toggles between the various stage setting by activating the single stage input. The controller 115 activates the first stage indicator 210 during setting of the first stage; the second stage indicator 220 during setting of the second stage; and the third stage indicator 230 during setting of the third stage.

Once the first, second, and third operating stages are set by the operator, the operator activates the start input 255 to begin the operation. Once the operation has begun, the controller 115 operates the motor 120 at the first stage, the second stage, and the third stage in subsequent order. To stop the operation, the operator uses the stop input 260. In some embodiments, during operation of the motor 120, the controller 115 will activate the various indicators of the user-interface 200 to display the current operating speed and duration of the motor 120.

FIGS. 4a-4d illustrate an operation 300 for receiving operating instructions for the pump system 110. The controller 115 receives an input from the first stage input 205 (Step 305). The controller activates the first stage indicator 210 and the speed indicator 265 (Step 310). The controller 115 receives inputs from at least one of the positive input 245 and negative input 250 (Step 315). The controller 115 activates the plurality of indicators 275 indicating the selected first stage speed (Step 320). The controller 115 receives an input from the first stage input 205 (Step 325). The controller 115 activates the duration indicator 270 (Step 330). The controller 115 receives inputs from at least one of the positive input 245 and negative input 250 (Step 335). The controller 115 activates the plurality of indicators 275 indicating the selected first stage duration (Step 340).

The controller 115 receives an input from the second stage input 215 (Step 345). The controller activates the second stage indicator 220 and the speed indicator 265 (Step 350). The controller 115 receives inputs from at least one of the positive input 245 and negative input 250 (Step 355). The controller 115 activates the plurality of indicators 275 indicating the selected second stage speed (Step 360). The controller 115 receives an input from the second stage input 215 (Step 365). The controller 115 activates the duration indicator 270 (Step 370). The controller 115 receives inputs from at least one of the positive input 245 and negative input 250 (Step 375). The controller 115 activates the plurality of indicators 275 indicating the selected second stage duration (Step 380).

The controller 115 receives an input from the third stage input 225 (Step 385). The controller activates the third stage indicator 230 and the speed indicator 265 (Step 390). The controller 115 receives inputs from at least one of the positive input 245 and negative input 250 (Step 395). The controller 115 activates the plurality of indicators 275 indicating the selected third stage speed (Step 400). The controller 115 receives an input from the third stage input 225 (Step 405). The controller 115 activates the duration indicator 270 (Step 410). The controller 115 receives inputs from at least one of the positive input 245 and negative input 250 (Step 415). The controller 115 activates the plurality of indicators 275 indicating the selected third stage duration (Step 420).

Figure 5:
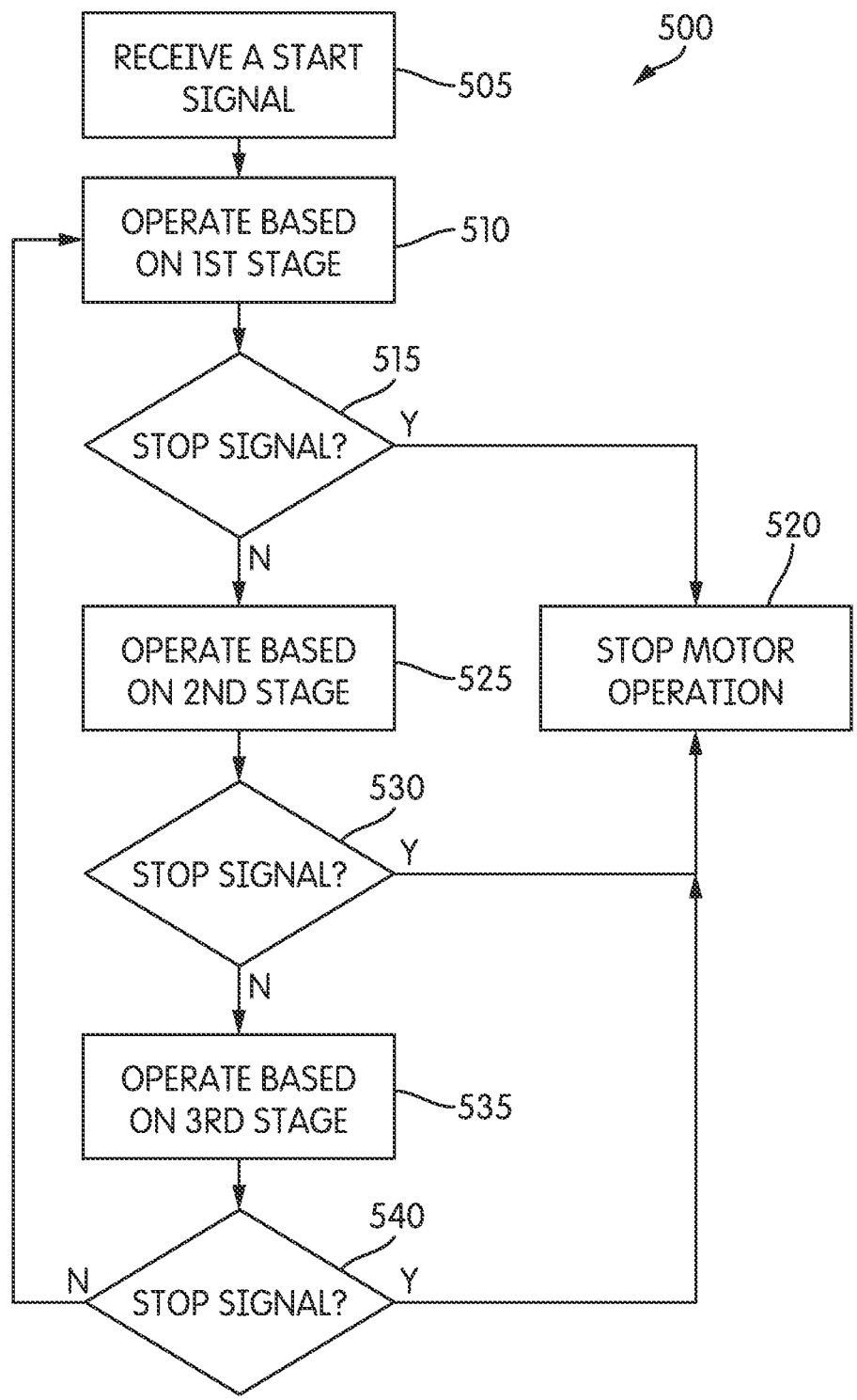
FIG. 5 illustrates an operation of the controller of FIG. 2.

FIG. 5 illustrates an operation 500 for operating the pump system 110 based on received operating instructions. The controller 115 receives a start signal from the start input 225 (Step 505). The controller 115 operates the motor 120 based on the first stage operating instructions (Step 510). The controller 115 determines if a stop signal has been received from the stop input 230 (Step 515). If a stop signal has been received, the controller 115 stops operation of the motor 120 (Step 520). If a stop signal has not been received, the controller 115 operates the motor 120 based on the second stage operating instructions (Step 525). The controller 115 determines if a stop signal has been received from the stop input 230 (Step 530). If a stop signal has been received, the operation reverts to Step 520 to stop operation of the motor 120. If a stop signal has not been received, the controller 115 operates the motor 120 based on the third stage operating instructions (Step 535). The controller 115 determines if a stop signal has been received from the stop input 230 (Step 540). If a stop signal has been received, the operation reverts to Step 520 to stop operation of the motor 120. If a stop signal has not been received, the operation reverts to Step 510.

In some embodiments, the controller 115 is operable to receive a stop signal at any time and stop operation of the motor 120 once the stop signal has been received. In some embodiments, when the motor operation is stopped after receiving a stop signal, the controller 115 will restart operation of the motor 120 upon receiving a start signal.

In some embodiments, the user-interface 200 is operable to receive an override operation. The override operation is a one-time operation that interrupts the normal operation. Once the override operation is complete, the controller 115 automatically returns to operating the motor 120 based on the normal operation. The operator sets an override operation by activating the override input 240. The override indicator 240 will activate indicating to the operator that the override operation is being set. The speed indicator 265 will also activate indicating to the operator that override speed is being set. The operator then uses the positive input 245 and negative input 250 to set the override speed. The operator then activates the override input 235 a second time. The override indicator 240 will remain activated. The speed indicator 265 will deactivate, while the duration indicator 270 will activate indicating to the operator that the override duration is being set. The operator then uses the positive input 245 and negative input 250 to set the override duration. If the motor 120 is currently operating according to the first stage, the second stage, or the third stage, the controller 115 will suspend the operation and operate the motor 120 according the override operation. Once the override operation is complete, the controller 115 will resume operating the motor 120 according to the suspended operation. If the motor 120 is not currently in operation, the controller 115 will operate the motor 120 according to the override operation.

Thus, the invention provides, among other things, a thin, low-cost user-interface for operating a pump system. Various features and advantages of the invention are set forth in the following claims.

What is claimed is:

1. A method of receiving operator instruction for controlling a pump system, the pump system including a pump housing, a motor connected to the pump housing, and a user-interface including an indicator strip including a plurality of discrete lights, the user-interface further including a speed indicator, a duration indicator, a positive input, a negative input, and a stage input, the method comprising:
   receiving a first input from the stage input;
   activating the speed indicator;
   receiving a stage speed input from at least one of the positive input and the negative input, the stage speed input representing a selected stage speed;
   activating the indicator strip indicating the selected stage speed;
   receiving a second input from the stage input;
   activating the duration indicator;
   receiving a stage duration input from at least one of the positive input and the negative input, the stage duration input representing a selected stage duration;
   activating the indicator strip indicating the selected stage duration; and
   operating the motor at the selected stage speed for the selected stage duration.

2. The method of claim 1, further including
   receiving a third input from the stage input;
   activating the speed indicator;

receiving a second stage speed input from at least one of the positive input and the negative input, the second stage speed input representing a second selected stage speed;
activating the indicator strip indicating the second selected stage speed;
receiving a fourth input from the stage input;
activating the duration indicator;
receiving a second stage duration input from at least one of the positive input and the negative input, the second stage duration input representing a second selected stage duration;
activating the indicator strip indicating the second selected stage duration; and
after completion of the selected stage duration, operating the motor based on the second selected stage speed and second selected stage duration.

3. The method of claim 1, further including
receiving a third input from a second stage input;
activating the speed indicator;
receiving a second stage speed input from at least one of the positive input and the negative input, the second stage speed input representing a second selected stage speed;
activating the indicator strip indicating the second selected stage speed;
receiving a fourth input from the second stage input;
activating the duration indicator;
receiving a second stage duration input from at least one of the positive input and the negative input, the second stage duration input representing a second selected stage duration;
activating the indicator strip indicating the second selected stage duration; and
after completion of the selected stage duration, operating the motor based on the second selected stage speed and second selected stage duration.

4. The method of claim 1, further including operating the motor upon activation of a start input.

5. The method of claim 1, further including stopping operation of the motor upon activation of a stop input.

6. A pump system comprising:
a pump housing;
a motor connected to the pump housing;
a user-interface including
an indicator strip with a plurality of discrete lights that indicate a selected pump speed and a selected pump duration,
a speed indicator,
a duration indicator,
a positive input,
a negative input, and
a stage input; and
a controller including a processor and a computer readable memory storing instructions that, when executed by the processor, cause the controller to
receive a first input from the stage input,
activate the speed indicator,
receive a stage speed input from at least one of the positive input and the negative input, the stage speed input representing a selected stage speed,
activate the indicator strip indicating the selected stage speed,
receive a second input from the stage input,
activate the duration indicator,
receive a stage duration input from at least one of the positive input and the negative input, the stage duration input representing a selected stage duration,
activate the indicator strip indicating the selected stage duration, and
operate the motor at the selected stage speed for the selected stage duration.

7. The controller of claim 6, wherein the instructions, when executed by the processor, further cause the controller to
receive a third input from the stage input;
activate the speed indicator;
receive a second stage speed input from at least one of the positive input and the negative input, the second stage speed input representing a selected second stage speed;
activate the indicator strip indicating the selected second stage speed;
receive a fourth input from the stage input;
activating the duration indicator;
receive a second stage duration input from at least one of the positive input and the negative input, the second stage duration input representing a selected second stage duration;
activate the indicator strip indicating the selected second stage duration; and
after completion of the selected stage duration, operate the motor at the selected second stage speed for selected second stage duration.

8. The controller of claim 6, wherein the instructions, when executed by the processor, further cause the controller to
receive a third input from a second stage input;
activate the speed indicator;
receive a second stage speed input from at least one of the positive input and the negative input, the second stage speed input representing a second selected stage speed;
activate the indicator strip indicating the second selected stage speed;
receive a fourth input from the second stage input;
activating the duration indicator;
receive a second stage duration input from at least one of the positive input and the negative input, the second stage duration input representing a second selected stage duration;
activate the indicator strip indicating the second selected stage duration; and
after completion of the selected stage duration, operate the motor at the second selected stage speed for second selected stage duration.

9. The user-interface of claim 6, further including a start input, wherein the controller operates the motor upon activation of the start input.

10. The user-interface of claim 6, further including a stop input, wherein the controller stops operation of the motor upon activation of the stop input.

11. The user-interface of claim 6, wherein the indicator strip is arranged in a linear or circular manner.

12. The user-interface of claim 6, further including an overlay membrane, wherein the overlay membrane labels the indicator strip, the positive input, the negative input, and the plurality of stage inputs.

13. The user-interface of claim 12, wherein the overlay membrane composed of one of a plastic material and a rubber material.

14. A pump system comprising:
a pump housing;
a motor connected to the pump housing;
a user-interface including
an indicator strip including a plurality of discrete lights that indicate a selected pump speed and a selected pump duration, a speed indicator,
a duration indicator,
a positive input,
a negative input,
a first stage input,
a second stage input, and
a third stage input; and
a controller including a processor and a computer readable memory storing instructions that, when executed by the processor, cause the controller to
receive a first input from the first stage input,
activate the speed indicator,
receive a first stage speed input from at least one of the positive input and the negative input, the first stage speed input representing a first selected stage speed,
activate the indicator strip indicating the first selected stage speed,
receive a second input from the first stage input,
activate the duration indicator,
receive a first stage duration input from at least one of the positive input and the negative input, the first stage duration input representing a first selected stage duration,
activate the indicator strip indicating the first selected stage duration,
receive a third input from the second stage input, activate the speed indicator,
receive a second stage speed input from at least one of the positive input and the negative input, the second stage speed input representing a second selected stage speed,
activate the indicator strip indicating the second selected stage speed,
receive a fourth input from the second stage input, activating the duration indicator,
receive a second stage duration input from at least one of the positive input and the negative input, the second stage duration input representing a second selected stage duration,
activate the indicator strip indicating the second selected stage duration,
receive a fifth input from the third stage input,
activate the duration indicator,
receive a third stage duration input from at least one of the positive input and the negative input, the third stage duration input representing a third selected stage duration,
activate the indicator strip indicating the third selected stage duration,
receive a sixth input from the third stage input,
activate the speed indicator,
receive a third stage speed input from at least one of the positive input and the negative input, the third stage speed input representing a third selected stage speed,
activate the indicator strip indicating the third selected stage speed,
operate the motor at the first selected stage speed for first selected stage duration,
after completion of the first selected stage duration, operate the motor at the second selected stage speed for second selected stage duration, and
after completion of the second selected stage duration operate motor at the third selected stage speed for the third selected stage duration.

15. The user-interface of claim 14, wherein the indicator strip is arranged in a linear or circular manner.

16. The user-interface of claim 14, further including an overlay membrane, wherein the overlay membrane labels the indicator strip, the positive input, the negative input, and the plurality of stage inputs.

17. The user-interface of claim 16, wherein the overlay membrane composed of one of a plastic material and a rubber material.

18. The user-interface of claim 14, further including a start input, wherein the controller operates the motor upon activation of the start input.

19. The user-interface of claim 14, further including a stop input, wherein the controller stops operation of the motor upon activation of the stop input.

\* \* \* \* \*